UNITED STATES PATENT OFFICE.

JOSEPH P. HARDIN, OF PAWNEE CITY, NEBRASKA.

COMPOSITION FOR THE MANUFACTURE OF A TILE.

965,894.   Specification of Letters Patent.   Patented Aug. 2, 1910.

No Drawing.   Application filed October 11, 1909. Serial No. 522,154.

*To all whom it may concern:*

Be it known that I, JOSEPH P. HARDIN, a citizen of the United States, residing at Pawnee City, in the county of Pawnee and State of Nebraska, have invented a new and useful Composition for the Manufacture of a Tile.

My composition consists of the following ingredients combined in the proportions stated, five being used as the unit of composition and divided as follows, to-wit: crushed rock, one and one fourth parts; burnt gumbo, one and one fourth parts; soft coal cinders, one part; cut straw, one half part; burnt gypsum, one part. These ingredients must be thoroughly mixed and moistened with water before placing in molds prepared for the purpose; after which it must be tamped or pressed sufficient to make a solid body, and allowed to remain for a short time until it has set, when it may be removed, after which it is ready for immediate use.

This tile when made of the above materials and in the manner indicated, will very readily sweat or filter water through at any rate desired, depending upon the degree of pressure used in its manufacture. Also, it will readily take in and absorb the water from the outside, carrying it off from wet and swampy lands.

As a substitute for the crushed rock, crushed shale may be used in the same proportion. As a substitute for the soft coal cinders crushed coke may be used in the same proportion. As a substitute for the cut straw, wood fiber may be used in the same proportion. Said substitutes to be mixed and joined with the other ingredients mentioned and put through the same process in order to make the same finished product and when so combined will make a tile possessing the same features and will perform the same functions claimed for the tiling made of the original material.

I claim as follows:

The herein described composition of material to be used in the manufacture of a tile for sub-irrigation and drainage purposes, consisting of crushed rock one and one fourth parts: burnt gumbo, one and one fourth parts: soft coal cinders one part: cut straw one half part: burnt gypsum, one part, substantially as described.

JOSEPH P. HARDIN.

Witnesses:
LEONARD H. BAILEY,
T. WENDELL BAILEY.